US012729120B2

(12) United States Patent
Sanderson et al.

(10) Patent No.: US 12,729,120 B2
(45) Date of Patent: Sep. 8, 2026

(54) COMPOUND FOR TRANSPARENT CONDUCTIVE COATINGS

(71) Applicant: Pilkington Group Limited, Lathom (GB)

(72) Inventors: Kevin Sanderson, Upholland (GB); Anna Colley, Rainhill (GB); John Hodgkinson, Lathom (GB); David Strickler, Toledo, OH (US); Lila Dahal, Perrysburg, OH (US); Vikash Ranjan, Perrysburg, OH (US); Matthew Rosseinsky, Liverpool (GB); Matthew Dyer, Liverpool (GB); Dihao Zeng, Liverpool (GB); Guopeng Han, Liverpool (GB); Jonathon Alaria, Liverpool (GB); Troy Manning, Liverpool (GB); Thomas Beesley, Liverpool (GB); Anna Krowitz, Liverpool (GB)

(73) Assignee: Pilkington Group Limited, Lathom (GB)

( * ) Notice: Subject to any disclaimer, the term of this patent is extended or adjusted under 35 U.S.C. 154(b) by 459 days.

(21) Appl. No.: 18/485,372

(22) Filed: Oct. 12, 2023

(65) Prior Publication Data

US 2024/0124308 A1 Apr. 18, 2024

Related U.S. Application Data

(60) Provisional application No. 63/417,051, filed on Oct. 18, 2022.

(51) Int. Cl.

*C01B 25/45* (2006.01)
*C01B 25/37* (2006.01)

(Continued)

(52) U.S. Cl.

CPC .............. *C01B 25/45* (2013.01); *C01B 25/37* (2013.01); *C03C 17/245* (2013.01); *C09D 1/00* (2013.01);

(Continued)

(58) Field of Classification Search

None

See application file for complete search history.

(56) References Cited

U.S. PATENT DOCUMENTS 3,186,955 A * 6/1965 Szabo ........................ C07C 5/48 585/617
3,912,524 A 10/1975 Flannery et al.

(Continued)

FOREIGN PATENT DOCUMENTS

| CN | 108439806 A | 8/2018 |
| --- | --- | --- |
| CN | 110451781 A | 11/2019 |

(Continued)

OTHER PUBLICATIONS

N. Barrier et al., Synthesis crystal structure and TEM study of the new hollandite-type, Journal of Alloys and Compounds, Elsevier, 2001.

(Continued)

*Primary Examiner* — Stefanie J Cohen

(74) *Attorney, Agent, or Firm* — Marshall & Melhorn, LLC

(57) ABSTRACT

A compound represented by one of the formulae:

$$Ba_aMo_bO_c \quad (1),$$

$$MO_dP_eO_f \quad (2) \text{ or}$$

$$Ba_gMo_hP_iO_j \quad (3)$$

Figure 1:
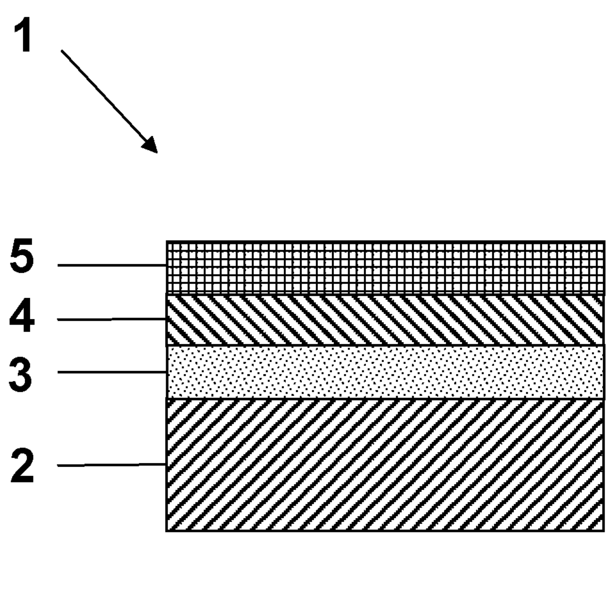

wherein for formula (1) the ratio of a:b is from 1:100 to 100:1, (Continued)

wherein for formula (2) the ratio of d:e is from 1:100 to less than 1:1 or from greater than 1:1 to 100:1, wherein for formula (3) the ratio of g:h is from 1:100 to less than 1.5:1, wherein for formula (3) the ratio of g:i is from 1:100 to 100:1, wherein for formula (3) the ratio of h:i is from 1:100 to less than 1:2, or from greater than 1:2 to less than 2:1, or from greater than 2:1 to 100:1, and wherein the molybdenum present within the compound is in the 5+ oxidation state.

20 Claims, 2 Drawing Sheets

(51) Int. Cl.
*C03C 17/245* (2006.01)
*C09D 1/00* (2006.01)

(52) U.S. Cl.
CPC .. *C03C 2217/228* (2013.01); *C03C 2218/156* (2013.01)

(56) References Cited

U.S. PATENT DOCUMENTS 4,151,191 A * 4/1979 Happel .................. C07C 1/043 502/220
5,995,359 A 11/1999 Klee et al.
2012/0135331 A1* 5/2012 Rosseinsky ......... H01M 4/9016 252/519.15
2015/0093651 A1 4/2015 Aihara et al.
2017/0088933 A1 3/2017 Launey et al.
2019/0144330 A1 5/2019 Kang et al.

FOREIGN PATENT DOCUMENTS

EP 2417076 A1 2/2012
GB 761289 A 11/1956

OTHER PUBLICATIONS

Leclaire et al., Two novel Mo(V) and Mo(V)/Mo(VI) barium phosphates with a tunnel structure: ß-$Ba(MoO)_2(P_2O_7)_2$, and $Ba(MoO)_2O(P_2O_7)PO_4$, Journal of Solid State Chemistry, Elsevier, 2005.

* cited by examiner

COMPOUND FOR TRANSPARENT CONDUCTIVE COATINGS

The present invention relates to a compound, a sintered body comprising the compound, a glass article coated with the compound, a method of manufacturing the glass article and the use of the compound.

Coatings on substrate surfaces find uses in many fields. Some of the more useful coatings are metal oxides, for example, tin oxide. Some metal oxides (including doped tin oxide) can form transparent conductive oxide (TCO) coatings. TCOs have high optical transmission at visible wavelengths and electrical conductivity that is close to that of metals.

The main applications for TCOs are as energy saving, low-emissivity coatings for architectural windows, as high scattering layers that form the front electrical contact of a wide variety of photovoltaic (PV) thin film modules and as glass coatings in a number of electronic devices including liquid-crystal displays, OLEDs and touchscreens.

Common TCOs include doped zinc oxide (e.g. ZnO:Al [ZAO] or ZnO:B), tin oxide doped with fluorine ($SnO_2$:F) and an oxide of indium and tin (ITO). However, it would be useful to develop new transparent conductive materials (TCMs) that can improve on the properties of the hitherto known materials.

Typically, TCOs are wide band gap semiconductors that rely on heavy doping to improve the carrier concentration. In contrast, correlated metals provide an alternative route to thin film TCMs. Due to the large intrinsic carrier density in conventional metals, the free carrier reflection is generally within or above the visible spectrum. However, in a correlated metal transparent conductor, interelectron repulsion shifts the plasma frequency out of the visible region to enhance optical transmission, while the high carrier density of the metal retains sufficient conductivity.

According to a first aspect of the present invention there is provided a compound represented by one of the formulae:

$$Ba_aMo_bO_c \quad (1),$$

$$MO_dP_eO_f \quad (2) \text{ or}$$

$$Ba_gMo_hP_iO_j \quad (3)$$

wherein for formula (1) the ratio of a:b is from 1:100 to 100:1, wherein for formula (2) the ratio of d:e is from 1:100 to less than 1:1 or from greater than 1:1 to 100:1, wherein for formula (3) the ratio of g:h is from 1:100 to less than 1.5:1, wherein for formula (3) the ratio of g:i is from 1:100 to 100:1, wherein for formula (3) the ratio of h:i is from 1:100 to less than 1:2, or from greater than 1:2 to less than 2:1, or from greater than 2:1 to 100:1, and wherein the molybdenum present within the compound is in the 5+ oxidation state.

It has surprisingly been found that compounds according to the first aspect are useful as semiconductors, for example in some cases as TCMs, and provide useful optical properties.

In the context of the present invention, where a layer is said to be "based on" a particular material or materials, this means that the layer predominantly consists of the corresponding said material or materials, which means typically that it comprises at least about 50 at. % of said material or materials.

In the following discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention. Typically, when referring to compositions, a composition consisting essentially of a set of components will comprise less than 5% by weight, typically less than 3% by weight, more typically less than 1% by weight of non-specified components.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may be taken to include the meaning "consists of" or "consisting of".

References herein such as "in the range x to y" are meant to include the interpretation "from x to y" and so include the values x and y.

In the context of the present invention a transparent material or a transparent substrate is a material or a substrate that is capable of transmitting visible light so that objects or images situated beyond or behind said material can be distinctly seen through said material or substrate.

In the context of the present invention the "thickness" of a layer (or coating) is, for any given location at a surface of the layer, represented by the distance through the layer, in the direction of the smallest dimension of the layer, from said location at a surface of the layer to a location at an opposing surface of said layer.

Preferably for formula (1) the ratio of a:b is from 1:50 to 50:1, more preferably from 1:50 to 1:1.5 or from 1.5:1 to 50:1, even more preferably from 1:40 to 1:1.8 or from 1.8:1 to 40:1, even more preferably from 1:30 to 1:2 or from 2:1 to 30:1.

Preferably for formula (1) the ratio of c:(a+b) is greater than 1:1, more preferably greater than 1.05:1, even more preferably greater than 1.1:1, even more preferably greater than 1.2:1, most preferably greater than 1.3:1, but preferably less than 10:1, more preferably less than 5:1, even more preferably less than 4:1, most preferably less than 3:1.

Preferably for formula (2) the ratio of d:e is from 1:50 to 0.95:1 or from 1.05:1 to 50:1, more preferably the ratio of d:e is from 1:30 to 0.9:1 or from 1.1:1 to 30:1, even more preferably the ratio of d:e is from 1:30 to 0.8:1 or from 1.2:1 to 30:1.

Preferably for formula (2) the ratio of f:(d+e) is greater than 2:1, more preferably greater than 2.05:1, even more preferably greater than 2.1:1, even more preferably greater than 2.13:1, most preferably greater than 2.15:1, but preferably less than 5:1, more preferably less than 3:1, even more preferably less than 2.5:1, most preferably less than 2.4:1.

Preferably for formula (3) the ratio of g:h is from 1:50 to 1.45:1, more preferably from 1:50 to 1.4:1, even more preferably from 1:40 to 1.3:1, even more preferably from 1:30 to 1.2:1.

Preferably for formula (3) the ratio of g:i is from 1:50 to 50:1, more preferably from 1:20 to 10:1, even more preferably from 1:18 to 2:1, even more preferably from 1:16 to 1.5:1.

Preferably for formula (3) the ratio of h:i is from 1:50 to 1:2.05, or from 1:1.95 to 1.95:1, or from 2.05:1 to 50:1; more preferably from 1:30 to 1:2.05, or from 1:1.95 to 1.95:1, or from 2.05:1 to 30:1; more preferably from 1:10 to 1:2.1, or from 1:1.9 to 1.9:1, or from 2.1:1 to 10:1; even more preferably from 1:3 to 1:2.1, or from 1:1.9 to 1.9:1, or from 2.1:1 to 3:1; most preferably from 1:3 to 1:2.15, or from 1:1.85 to 1.85:1, or from 2.15:1 to 3:1.

Preferably for formula (3) the ratio of j:(g+h+i) is greater than 1:1, more preferably greater than 1.5:1, even more preferably greater than 1.9:1, even more preferably greater than 2:1, most preferably greater than 2.1:1, but preferably less than 10:1, more preferably less than 3:1, even more preferably less than 2.5:1, most preferably less than 2.4:1.

In a preferred embodiment,

- for formula (1) the ratio of a:b is from 1:40 to 1:1.8 or from 1.8:1 to 40:1,
- for formula (2) the ratio of d:e is from 1:30 to 0.9:1 or from 1.1:1 to 30:1, and
- for formula (3) the ratio of g:h is from 1:40 to 1.3:1, the ratio of g:i is from 1:18 to 2:1, and the ratio of h:i is from 1:3 to 1:2.1, or from 1:1.9 to 1.9:1, or from 2.1:1 to 3:1.

Preferably for formula (1), a=at least 1, more preferably a=at least 2. Preferably a=1 to 100, more preferably a=1 to 50, even more preferably a=1 to 20, even more preferably a=1 to 10 or a=2 to 10.

Preferably for formula (1), b=at least 2, in some embodiments preferably b=at least 3. Preferably b=1 to 100, more preferably b=2 to 50, even more preferably b=2 to 15, even more preferably b=2 to 10 or b=3 to 10.

Preferably for formula (1), c=at least 3, more preferably c=at least 4. Preferably c=3 to 100, more preferably c=3 to 50, even more preferably c=3 to 20, even more preferably c=4 to 20.

Preferably for formula (1), a=1 to 10, b=2 to 10 and c=4 to 20. Alternatively, for any combination of a, b and c within the ranges set out in this specification, each of a, b and c may be multiplied by an integer, provided the integer is the same, plus or minus 1, for each of a, b and c, i.e. the compound may be a compositional equivalent of formula (1).

Preferably the compound represented by formula (1) is selected from $BaMo_2O_6$, $Ba_2Mo_6O_{17}$, $Ba_4Mo_2O_9$, and $Ba_6Mo_2O_{11}$, or a compositional equivalent of any of these compounds, meaning that for each of these compounds, each of a, b and c may be multiplied by an integer, provided the integer is the same, plus or minus 1, for each of a, b and c.

Preferably for formula (2), d=at least 1, more preferably d=at least 2. Preferably d=1 to 100, more preferably d=1 to 50, even more preferably d=1 to 10, even more preferably d=1 to 6 or d=2 to 6.

Preferably for formula (2), e=at least 1, in some embodiments preferably e=at least 2. Preferably e=1 to 100, more preferably e=1 to 50, even more preferably e=1 to 10, even more preferably e=1 to 8 or e=2 to 8.

Preferably for formula (2), f=at least 5, more preferably f=at least 6. Preferably f=5 to 100, more preferably f=8 to 50, even more preferably f=9 to 30, even more preferably f=9 to 20.

Preferably for formula (2), d=1 to 6, e=1 to 8 and f=9 to 20. Alternatively, for any combination of d, e and f within the ranges set out in this specification, each of d, e and f may be multiplied by an integer, provided the integer is the same, plus or minus 1, for each of d, e and f, i.e. the compound may be a compositional equivalent of formula (2).

Preferably the compound represented by formula (2) is selected from $MoP_3O_{10}$, $Mo_3PO_{10}$, and $Mo_4P_2O_{15}$, or a compositional equivalent of any of these compounds, meaning that for each of these compounds, each of d, e and f may be multiplied by an integer, provided the integer is the same, plus or minus 1, for each of d, e and f.

Preferably for formula (3), g=at least 1, in some embodiments preferably g=at least 2. Preferably g=1 to 100, more preferably g=1 to 50, even more preferably g=1 to 10, even more preferably g=1 to 8 or g=1 to 6.

Preferably for formula (3), h=at least 1, in some embodiments preferably h=at least 2. Preferably h=1 to 100, more preferably h=1 to 50, even more preferably h=1 to 10, even more preferably h=1 to 8 or h=2 to 8.

Preferably for formula (3), i=at least 1, in some embodiments preferably i=at least 2.

Preferably i=1 to 100, more preferably i=1 to 50, even more preferably i=1 to 20, even more preferably i=1 to 15.

Preferably for formula (3), j=at least 6, more preferably j=at least 10. Preferably j=6 to 100, more preferably j=6 to 80, even more preferably j=6 to 70, even more preferably j=6 to 60.

Preferably for formula (3), g=1 to 8, h=1 to 8, i=1 to 15 and j=6 to 60. Alternatively, for any combination of g, h, i and j within the ranges set out in this specification, each of g, h, i and j may be multiplied by an integer, provided the integer is the same, plus or minus 1, for each of g, h, i and j, i.e. the compound may be a compositional equivalent of formula (3). E.g. $BaMo_2P_2O_{11}$ is a compositional equivalent of $Ba_5Mo_8P_{12}O_{55}$.

Preferably the compound represented by formula (3) is selected from $BaMoPO_6$, $BaMo_4P_4O_{21}$, $Ba_5Mo_8P_{12}O_{55}$, or a compositional equivalent of any of these compounds, meaning that for each of these compounds, each of g, h, i and j may be multiplied by an integer, provided the integer is the same, plus or minus 1, for each of g, h, i and j.

Preferably the compound is represented by formula (1) or formula (3) only, more preferably the compound is represented by formula (3) only.

According to a second aspect of the present invention there is provided a sintered body comprising a compound represented by one of the formulae:

$$Ba_aMo_bO_c \quad (1),$$

$$MO_dP_eO_f \quad (2) \text{ or}$$

$$Ba_gMo_hP_iO_j \quad (3)$$

- wherein for formula (1) the ratio of a:b is from 1:100 to 100:1,
- wherein for formula (2) the ratio of d:e is from 1:100 to 100:1,
- wherein for formula (3) the ratio of g:h is from 1:100 to 100:1,
- wherein for formula (3) the ratio of g:i is from 1:100 to 100:1, wherein for formula (3) the ratio of h:i is from 1:100 to 100:1, and wherein the molybdenum present within the compound is in the 5+ oxidation state.

Preferably for formula (1) the ratio of a:b is from 1:50 to 50:1, more preferably the ratio of a:b is from 1:10 to 10:1, even more preferably the ratio of a:b is from 1:5 to 5:1.

Preferably for formula (2) the ratio of d:e is from 1:50 to 50:1, more preferably the ratio of d:e is from 1:10 to 10:1.

Preferably for formula (3) the ratio of g:h is from 1:50 to 50:1, more preferably from 1:50 to 10:1, even more preferably from 1:50 to 2:1, even more preferably from 1:50 to 1.2:1.

Preferably for formula (3) the ratio of g:i is from 1:40 to 40:1, more preferably from 1:30 to 20:1, even more preferably from 1:20 to 10:1, even more preferably from 1:18 to 3:1.

Preferably for formula (3) the ratio of h:i is from 1:50 to 1:50, more preferably from 1:30 to 30:1, more preferably from 1:10 to 10:1, even more preferably from 1:5 to 5:1, most preferably from 1:3 to 3:1.

Preferably the compound of the sintered body of the second aspect is the compound of the first aspect.

According to a third aspect of the present invention there is provided a coated glass article comprising:

a glass substrate and a coating on the glass substrate, wherein the coating comprises a first layer based on a compound represented by one of the formulae:

$$Ba_aMo_bO_c \quad (1),$$

$$MO_dP_eO_f \quad (2) \text{ or}$$

$$Ba_gMo_hP_iO_j \quad (3)$$

wherein for formula (1) the ratio of a:b is from 1:100 to 100:1, wherein for formula (2) the ratio of d:e is from 1:100 to 100:1, wherein for formula (3) the ratio of g:h is from 1:100 to 100:1, wherein for formula (3) the ratio of g:i is from 1:100 to 100:1, wherein for formula (3) the ratio of h:i is from 1:100 to 100:1, and wherein the molybdenum present within the compound is in the 5+ oxidation state.

Preferably the compound of the first layer of the coating of the third aspect is the compound of the first aspect or the compound of the second aspect.

The first layer may be directly or indirectly formed on the glass substrate.

Preferably the first layer has a thickness of at least 10 nm, more preferably at least 100 nm, even more preferably at least 150 nm, most preferably at least 180 nm, but preferably at most 700 nm, more preferably at most 500 nm, even more preferably at most 400 nm, most preferably at most 300 nm.

The coating may further comprise one or more lower layer between the glass substrate and the first layer. Alternatively, or additionally, the coating may further comprise one or more upper layer located further from the glass substrate than the first layer. Said lower layer and/or said upper layer may each comprise one or more dielectric layer. Preferably said dielectric layers comprise one or more anti-reflective layers that enable the coated glass article to exhibit a visible light reflection that is lower than the visible light reflection exhibited by the glass substrate alone.

Preferably the coating is located on a first major surface of the glass substrate. Preferably the coating coats the majority of the first major surface. More preferably the coating coats substantially all of the first major surface. Most preferably the coating coats all of the first major surface. Preferably at least one, more preferably each, of the first layer and any other layer that is present, is a continuous layer. Preferably the lower layer directly coats all of the first major surface, i.e. the lower layer is in direct contact with all of the first major surface. Preferably at least one, more preferably each, of the first layer and the upper layer indirectly coats all of the first major surface. In this context, where a layer is said to "indirectly coat all of the first major surface" this means that if the layer in question was in direct contact with the first major surface rather than there being at least one other layer in between, then the layer in question would be in direct contact with all of the first major surface.

Preferably the glass substrate is transparent. The transparent glass substrate may be clear or tinted. Preferably the transparent glass substrate is a clear transparent glass substrate. The transparent glass substrate may be a metal oxide-based glass pane.

The glass pane may be a clear or tinted float glass pane. Preferably the glass pane is a clear glass pane. A typical soda-lime-silicate glass composition is (by weight), $SiO_2$ 69-74%; $Al_2O_3$ 0-3%; $Na_2O$ 10-16%; $K_2O$ 0-5%; MgO 0-6%; CaO 5-14%; $SO_3$ 0-2% and $Fe_2O_3$ 0.005-2%. The glass composition may also contain other additives, for example, refining aids, which would normally be present in an amount of up to 2%. By clear float glass, it is meant a glass having a composition as defined in BS EN 572-1 and BS EN 572-2 (2004). For clear float glass, the $Fe_2O_3$ level by weight is typically 0.11%. Float glass with an $Fe_2O_3$ content less than about 0.05% by weight is typically referred to as low iron float glass. Such glass usually has the same basic composition of the other component oxides i.e. low iron float glass is also a soda-lime-silicate glass, as is clear float glass. Typically, tinted float glass has at least 0.5% by weight $Fe_2O_3$, e.g. 1.0% by weight $Fe_2O_3$. Alternatively, the glass pane is a borosilicate-based glass pane, an alkali-aluminosilicate-based glass pane, or an aluminium oxide-based crystal glass pane.

All transmittance, reflectance and colour (a* and b*) values mentioned in this specification are according to the CIELAB colour scale system using Illuminant D65, ten degree observer.

Preferably the coated glass article exhibits a visible light transmittance of at least 60%, more preferably at least 70%, even more preferably at least 80%, even more preferably at least 90.

Preferably the coated glass article exhibits a sheet resistance (Rs) of less than 8 ohms/sq, more preferably less than 7 ohms/sq, even more preferably less than 6 ohms/sq, most preferably less than 5 ohms/sq.

In certain embodiments the coated glass article may further comprise a second coating located on an opposing major surface of the glass substrate, i.e. the coating referred to in the preceding paragraphs is located on a first major surface of the glass substrate and the second coating is located on the opposing major surface of the glass substrate.

The second coating may comprise an antireflection, low-emissivity and/or solar control coating.

In some embodiments an opposing major surface of the glass substrate may be bonded to a second glass substrate by a ply of plastics interlayer. Preferably the plastics interlayer comprises polyvinyl butyral (PVB). Any of the opposing major surface of the glass substrate and either surface of the second glass substrate may be coated, for example with an antireflection, low-emissivity and/or solar control coating.

In particular embodiments the coated glass article, e.g. the coated glass article of the two immediately preceding paragraphs, may be combined with further glass substrates (e.g. one or two further glass substrates) to form a glazing unit. The coated glass article may be held in a spaced apart relationship with any adjacent further glass substrate to form an insulated glazing unit. Any further glass substrate may be held in a spaced apart relationship with any adjacent further glass substrate to form an insulated glazing unit.

According to a fourth aspect of the present invention there is provided a method of manufacturing the compound according to the first aspect, comprising:

i) for compounds represented by formula (1), providing a Ba-containing precursor, a Mo-containing precursor and an O-containing precursor, wherein at least two of said precursors may be the same precursor, and reacting said precursors to form a compound represented by formula (1), or ii) for compounds represented by formula (2), providing a Mo-containing precursor, a P-containing precursor and an O-containing precursor, wherein at least two of said precursors may be the same precursor, and reacting said precursors to form a compound represented by formula (2), or iii) for compounds represented by formula (3), providing a Ba-containing precursor, a Mo-containing precursor, a P-containing precursor and an O-containing precursor, wherein at least two of said precursors may be the same precursor, and reacting said precursors to form a compound represented by formula (3).

The Ba-containing precursor may comprise one or more of BaO, $Ba_2MoO_5$, $BaMoO_4$, $BaCO_3$, $Ba(thd)_2$ (Barium tetramethylheptanedionate), Barium bis(N,N,N',N',N"-pentamethyldiethylenetriamine)bis[BREW] $(Ba(C_9H_{23}N_3)_2[C_xH_yC(O)CHC(O)C_xH_y]_2$ (x=3-4, y=2x+1)), Bis(6,6,7,7,8,8,8-heptafluoro-2,2-dimethyl-3, 5-octanedionate)barium $[Ba(FOD)_2]$, Bis(pentamethylcyclopentadienyl)barium, and Bis(n-propyltetramethylcyclopentadienyl)barium.

The Mo-containing precursor may comprise one or more of $MoO_2$, $Ba_2MoO_5$, $BaMoO_4$, $MoO_3$, $MoO_2(thd)_2$ (Molybdenum(VI) di-oxo bis(2,2,6,6-tetramethyl-3,5-heptanedionate), $MoCl_5$, $Mo(CO)_6$, $MoO_2(acac)_2$, Bis(t-butylimido)bis(dimethylamino)molybdenum(VI), Bis(ethylbenzene) molybdenum, and Cycloheptatriene molybdenum tricarbonyl.

The P-containing precursor may comprise one or more of a trialkyl phosphate e.g. Triethylphosphate or Trimethylphosphate, $P_2O_5$, $NH_4H_2PO_4$, $(NH_4)_2HPO_4$, $H_3PO_4$, triethylphosphite, phosphorus chloride, phosphorus oxychloride, and Tris(dimethylamino)phosphine.

The O-containing precursor may comprise one or more of ethyl acetate, molecular oxygen, water, dimethyamino ethanol (DMAE), $Ba_2MoO_5$, $BaMoO_4$, $BaCO_3$, $Ba(thd)_2$ (Barium tetramethylheptanedionate), Barium bis(N,N,N',N',N"-pentamethyldiethylenetriamine)bis[BREW] $(Ba(C_9H_{23}N_3)_2[C_xH_yC(O)CHC(O)C_xH_y]_2$ (x=3-4, y=2x+1)), 5-octanedionate)barium $[Ba(FOD)_2]$, $MoO_3$, $MoO_2(thd)_2$ (Molybdenum(VI) di-oxo bis(2,2,6,6-tetramethyl-3,5-heptanedionate), $Mo(CO)_6$, $MoO_2(acac)_2$, Cycloheptatriene molybdenum tricarbonyl, Triethylphosphate, Trimethylphosphate, $P_2O_5$, $NH_4H_2PO_4$, $H_3PO_4$, triethylphosphite, phosphorus oxychloride, and Tris(dimethylamino)phosphine.

The compound may be formed by a physical vapour deposition process, such as sputtering or pulsed laser deposition. Preferably the sputtering is carried out using a sintered body according to the second aspect as a ceramic sputtering target, more preferably in a substantially inert atmosphere. A substantially inert atmosphere is defined herein as an atmosphere with less than or equal to 10% oxygen.

Alternatively, the compound may be formed by chemical vapour deposition (CVD) e.g. metalorganic CVD (MOCVD), aerosol assisted CVD (AACVD or mist CVD), atomic layer deposition, a sol-gel process, spray pyrolysis or another solution-based process.

According to a fifth aspect of the present invention there is provided a method of manufacturing the coated glass article according to the third aspect comprising depositing a coating on a glass substrate, wherein the coating comprises a first layer based on a compound represented by one of the formulae:

$$Ba_aMo_bO_c \quad (1),$$

$$MO_dP_eO_f \quad (2) \text{ or}$$

$$Ba_gMo_hP_iO_j \quad (3)$$

wherein for formula (1) the ratio of a:b is from 1:100 to 100:1, wherein for formula (2) the ratio of d:e is from 1:100 to 100:1, wherein for formula (3) the ratio of g:h is from 1:100 to 100:1, wherein for formula (3) the ratio of g:i is from 1:100 to 100:1, wherein for formula (3) the ratio of h:i is from 1:100 to 100:1, and wherein the molybdenum present within the compound is in the 5+ oxidation state.

Preferably the coating is deposited by a physical vapour deposition process, such as sputtering or pulsed laser deposition. Preferably the sputtering is carried out using a sintered body according to the second aspect as a ceramic sputtering target, more preferably in a substantially inert atmosphere. A substantially inert atmosphere is defined herein as an atmosphere with less than or equal to 10% oxygen.

Alternatively, the coating may be deposited by chemical vapour deposition (CVD), a sol-gel process or another solution-based process.

According to a sixth aspect of the present invention there is provided the use of the compound of the first aspect as a coating for a glass article.

Preferably said use occurs in architectural or automotive applications. Said use may occur in a glazing frame, wall, bulkhead, blind, door, electronic device such as a PV module, liquid-crystal display or OLED, a touchscreen, mirror, container, furniture, splashback and/or vehicle window.

Any feature set out above in relation to the first aspect of the present invention may also be utilised in relation to any other aspects of the present invention.

Any invention described herein may be combined with any feature of any other invention described herein mutatis mutandis.

It will be appreciated that optional features applicable to one aspect of the invention can be used in any combination, and in any number. Moreover, they can also be used with any of the other aspects of the invention in any combination and in any number. This includes, but is not limited to, the dependent claims from any claim being used as dependent claims for any other claim in the claims of this application.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Figure 2:
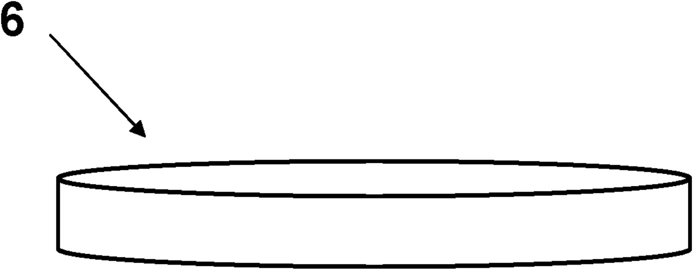
Figure 3:
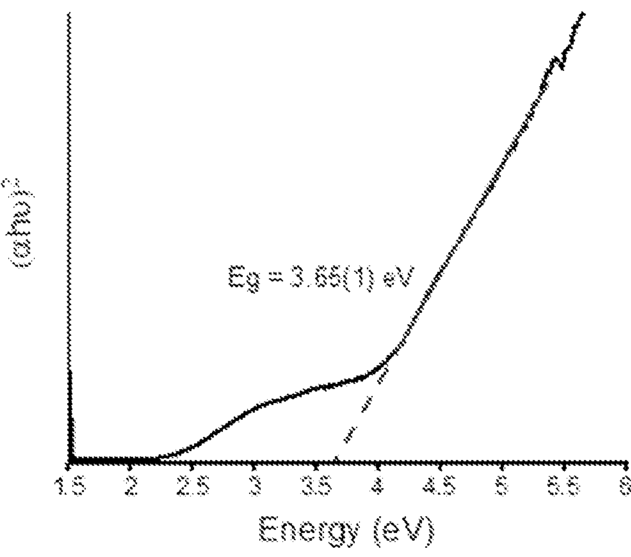
Figure 4:
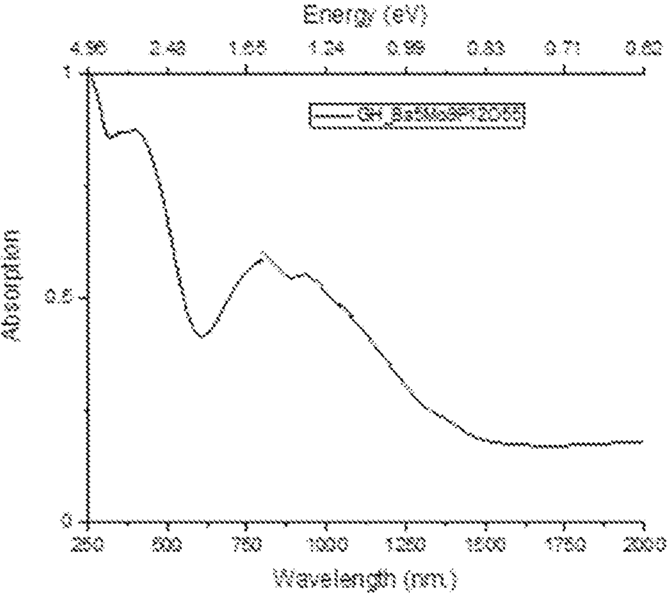

The invention will now be further described by way of the following specific embodiments, which are given by way of illustration and not of limitation, with reference to the accompanying drawings in which:

FIG. 1 is a schematic view, in cross-section, of a coated glass article in accordance with the present invention with an at least three-layer coating, FIG. 2 is a perspective view of a sintered body in accordance with the present invention, FIG. 3 shows a Tauc plot to determine the band gap of $Ba_5Mo_8P_{12}O_{55}$, and FIG. 4 shows a plot of absorption against wavelength/photon energy for $Ba_5Mo_8P_{12}O_{55}$.

FIG. 1 shows a cross-section of a coated glass article 1 according to certain embodiments of the present invention. Coated glass article 1 comprises a transparent float glass substrate 2 that has been sequentially coated using magnetron sputtering with one or more lower layers based on dielectric material 3, a layer based on a compound according to the present invention 4, and one or more upper layers based on dielectric material 5.

FIG. 2 shows a perspective view of a sintered body 6 in accordance with the present invention which is a ceramic sputtering target comprising a compound according to the present invention.

EXAMPLES

Preparation of $Ba_5Mo_8P_{12}O_{55}$:

$BaCO_3$, $NH_4H_2PO_4$, and $MoO_3$ were mixed in a 1:2:1.667 (0.99 g, 1.20 g and 1.15 g respectively) molar ratio to obtain the composition $BaMo_{1.667}P_2O_{11}$ which was heated in air at 600° C. for 10 hr to eliminate $CO_2$, $H_2O$, and $NH_3$. The resulting product was mixed with the required amount of Mo metal (0.333 mol equivalent, 0.16 g) and heated to 850° C. for 12 hr in an evacuated (>$10^{-3}$ mTorr) quartz tube. Single crystals were produced within the solidified product which were hand-selected and analysed by X-ray diffraction and energy dispersive X-ray spectrometry on a transmission electron microscopy instrument and were determined to have the composition $Ba_5Mo_8P_{12}O_{55}$.

A bulk powder synthesis of $Ba_5Mo_8P_{12}O_{55}$ was also carried out using $BaCO_3$, $NH_4H_2PO_4$, and $MoO_3$ mixed in a 5:12:6.667 molar ratio (0.99 g, 1.38 g and 0.96 g respectively) to obtain the composition $Ba_5Mo_{6.667}P_{12}O_{55}$ which was heated in air at 600° C. for 10 hr to eliminate $CO_2$, $H_2O$, and $NH_3$. The resulting product was then added to the required amount of Mo (1.333 mol equivalent, 0.13 g) and heated to 850° C. for 24 hr in an evacuated quartz tube. As a result, a high-level purity sample of $Ba_5Mo_8P_{12}O_{55}$ was obtained, as determined from an X-ray diffraction model and energy dispersive X-ray spectrometry on a transmission electron microscopy instrument.

$Ba_5Mo_8P_{12}O_{55}$ was found to be a wide band gap semiconductor that demonstrates selective absorption.

FIG. 3 shows a Tauc plot to determine the band gap of $Ba_5Mo_8P_{12}O_{55}$. The plot is a function of the Kubelka-Munk approximation of the absorption co-efficient against the photon energy. The Kubelka-Munk co-efficient was determined from UVvis diffuse reflectance spectroscopy of a powder sample. The function is $(\alpha h\nu)^{1/n}$ where $\alpha$ is the absorption coefficient (or Kubelka-Munk approximation), h is Plank's constant and $\nu$ is photon frequency. For an allowed direct transition n=½, so the term becomes $(\alpha h\nu)^2$.

Extrapolating the linear part of this plot (shown by the dashed line) to the x-axis revealed the band gap of $Ba_5Mo_8P_{12}O_{55}$ to be 3.65 eV which is 340 nm and thus in the UVa region.

FIG. 4 shows a plot of absorption against wavelength/photon energy for $Ba_5Mo_8P_{12}O_{55}$. The material exhibits a strong absorption edge at 2.07 eV=600 nm i.e. orange light.

Direct Preparation of $Ba_4Mo_2O_9$ as a Thin Film by Pulsed Laser Deposition (PLD):

Preparation of $Ba_2MoO_5$ powder precursor:

$$2BaCO_3+MoO_3\rightarrow Ba_2MoO_5+2CO_2$$

$BaCO_3$ was heated overnight at 500° C., while $MoO_3$ was heated overnight at 200° C. 10.51 g $BaCO_3$ and 3.83 g $MoO_3$ were weighed out whilst hot and mixed together. The mixture was ball milled in ethanol at 350 rpm for 15 mins, followed by 10 mins rest, for cycles, reversing the direction between each cycle. The powder mixture was then dried on a hot plate overnight before being heated in an alumina crucible at 1200° C. for hr. The powder mixture was reground in a pestle and mortar and heated in an alumina crucible at 1200° C. for 25 hr. A pure product was confirmed by XRD.

$Ba_2MoO_5$ powder (9.50 g) was formed into a 25 mm diameter dense pellet using direct current sintering at 1050° C. and 50 MPa in a graphite die. The dense pellet of $Ba_2MoO_5$ was loaded into the vacuum chamber of a pulsed laser deposition system and a thin film of $Ba_4Mo_2O_9$ was deposited onto a $SrTiO_3$ (111) single crystal substrate at 850° C., mTorr 5% $H_2$ in Ar (25 sccm), 220 mJ laser energy, 2 Hz, 5000 pulses. A $SrTiO_3$ protective capping layer to prevent oxidation from the atmosphere was grown at 600° C. under base pressure vacuum ($5\times10^{-7}$ to $5\times10^{-8}$ Torr), pulse frequency=2 Hz and with a laser fluence of 1.70 J/cm$^2$. A $SrTiO_3$ target was used which was prepared from $SrCO_3$ (8.05 g) and $TiO_2$ (4.35 g) by grinding with a pestle and mortar, heating at 1000° C. for 12 hr, regrinding, pressing into a 25 mm diameter pellet and heating at 1300° C. for 12 hr.

Other examples according to the invention are prepared using three bulk powder synthesis approaches. These are undertaken using the precursors set out in Table 1 below and the methods described below:

Method 1:

For each compound, the appropriate precursors are mixed in the amounts shown in Table 1, to give a nominal precursor $Ba_gMo_{5/6h}P_iO_j$ and heated in air at 600° C. for 10 hr to eliminate any $CO_2$, $H_2O$, and $NH_3$. The precursor is then transferred to an Ar filled glovebox and mixed with an additional (1/6 h mol equivalent) $Mo^0$ metal and then further heated at 850° C. for 24 hr in an evacuated (<$10^{-3}$ mTorr) quartz ampule to yield the desired compound.

Method 2:

For each compound the precursors are mixed by grinding in an agate pestle and mortar in the amounts shown in Table 1 while contained within an Ar filled glovebox. The mixture is pressed into a 10 mm diameter pellet in ~0.5 g batches, and placed into an alumina crucible which is subsequently sealed in an evacuated (<$10^{-3}$ mTorr) quartz ampule. The ampule is heated to 1100° C. and kept at the temperature for 12 hours. Once cooled the ampule is opened in the Ar filled glovebox, reground, resealed in an evacuated quartz ampule and heated again at the reaction temperature for another 12 hours. The heating and regrinding is repeated up to four times.

Method 3:

A precursor of the correct Ba:Mo ratio, as shown in Table 1, with Mo in the 6+ oxidation state is synthesised using methods reported in the literature. The $Mo^{6+}$ precursor (0.50 g) is then reduced using a flow (80 mL/min) of 5% $H_2$ in Ar at 1150° C. for up to 36 hours with intermittent grinding every 12 hours. The reduced sample is transferred to an Ar filled glovebox without exposure to air.

TABLE 1

| Compound Prepared | Method | Ba precursor | Mo precursor | P precursor |
|---|---|---|---|---|
| $BaMoPO_6$ | 1 | $BaCO_3$ (1.15 g) | $MoO_3$ (0.67 g) Mo (0.06 g, after first heating) | $NH_4H_2PO_4$ (0.70 g) |
| $BaMoPO_6$ | 2 | 2BaO (0.43 g) | $MoO_2$ (0.18 g) + $MoO_3$ (0.20 g) | $P_2O_5$ (0.20 g) |
| $MO_4P_2O_{15}$ | 2 | | $2MoO_2$ (0.77 g) + $2MoO_3$ (0.86 g) | $P_2O_5$ (0.43 g) |
| $Ba_2Mo_6O_{17}$ | 2 | 2BaO (0.27 g) | $3MoO_2$ (0.34 g) + $3MoO_3$ (0.38 g) | |
| $Ba_2Mo_6O_{17}$ | 3 | $BaMo_3O_{10}$ (0.50 g) + $H_2$ | | |
| $BaMo_2O_6$ | | BaO (0.36 g) | $MoO_2$ (0.30 g) + $MoO_3$ (0.34 g) | |
| $Ba_4Mo_2O_9$ | 2 | 4BaO (0.69 g) | $MoO_2$ (0.14 g) + $MoO_3$ (0.16 g) | |
| $Ba_4Mo_2O_9$ | 3 | $Ba_2MoO_5$ (1.00 g) + $H_2$ | | |

The invention is not restricted to the details of the foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A compound represented by one of the formulae:

$$Ba_aMo_bO_c \quad (1),$$

$$MO_dP_eO_f \quad (2) \text{ or}$$

$$Ba_gMo_hP_iO_j \quad (3)$$

wherein for formula (1) the ratio of a:b is from 1:100 to 100:1, wherein for formula (2) the ratio of d:e is from 1:100 to less than 1:1 or from greater than 1:1 to 100:1, wherein for formula (3) the ratio of g:h is from 1:100 to less than 1.5:1, wherein for formula (3) the ratio of g:i is from 1:100 to 100:1, wherein for formula (3) the ratio of h:i is from 1:100 to less than 1:2, or from greater than 1:2 to less than 2:1, or from greater than 2:1 to 100:1, and wherein the molybdenum present within the compound is in the 5+ oxidation state.

2. The compound according to claim 1, wherein for formula (1) the ratio of a:b is from 1:50 to 50:1.

3. The compound according to claim 1, wherein for formula (2) the ratio of d:e is from 1:50 to 0.95:1 or from 1.05:1 to 50:1.

4. The compound according to claim 1, wherein for formula (3) the ratio of g:h is from 1:50 to 1.45:1.

5. The compound according to claim 1, wherein for formula (3) the ratio of g:i is from 1:50 to 50:1.

6. The compound according to claim 1, wherein for formula (3) the ratio of h:i is from 1:50 to 1:2.05, or from 1:1.95 to 1.95:1, or from 2.05:1 to 50:1.

7. The compound according to claim 1, wherein for formula (1) the ratio of a:b is from 1:40 to 1:1.8 or from 1.8:1 to 40:1, for formula (2) the ratio of d:e is from 1:30 to 0.9:1 or from 1.1:1 to 30:1, and for formula (3) the ratio of g:h is from 1:40 to 1.3:1, the ratio of g:i is from 1:18 to 2:1, and the ratio of h:i is from 1:3 to 1:2.1, or from 1:1.9 to 1.9:1, or from 2.1:1 to 3:1.

8. The compound according to claim 1, wherein for formula (1), a=at least 1.

9. The compound according to claim 1, wherein for formula (1), a=1 to 10, b=2 to 10 and c=4 to 20.

10. The compound according to claim 1, wherein the compound represented by formula (1) is selected from $BaMo_2O_6$, $Ba_2Mo_6O_{17}$, $Ba_4Mo_2O_9$, and $Ba_6Mo_2O_{11}$, or a compositional equivalent of any of these compounds.

11. The compound according to claim 1, wherein for formula (2), d=at least 1 and/or wherein for formula (2), d=1 to 6, e=1 to 8 and f=9 to 20.

12. The compound according to claim 1, wherein the compound represented by formula (2) is selected from $MoP_3O_{10}$, $Mo_3PO_{10}$, and $Mo_4P_2O_{15}$, or a compositional equivalent of any of these compounds.

13. The compound according to claim 1, wherein for formula (3), g=at least 1 and/or wherein for formula (3), i=at least 1.

14. The compound according to claim 1, wherein for formula (3), g=1 to 8, h=1 to 8, i=1 to 15 and j=6 to 60.

15. The compound according to claim 1, wherein the compound represented by formula (3) is selected from $BaMoPO_6$, $BaMo_4P_4O_{21}$, $Ba_5Mo_8P_{12}O_{55}$, or a compositional equivalent of any of these compounds.

16. A coated glass article comprising:

a glass substrate and a coating on the glass substrate, wherein the coating comprises a first layer based on a compound represented by one of the formulae:

$$Ba_aMo_bO_c \quad (1),$$

$$MO_dP_eO_f \quad (2) \text{ or}$$

$$Ba_gMo_hP_iO_j \quad (3)$$

wherein for formula (1) the ratio of a:b is from 1:100 to 100:1, wherein for formula (2) the ratio of d:e is from 1:100 to 100:1, wherein for formula (3) the ratio of g:h is from 1:100 to 100:1, wherein for formula (3) the ratio of g:i is from 1:100 to 100:1, wherein for formula (3) the ratio of h:i is from 1:100 to 100:1, and wherein the molybdenum present within the compound is in the 5+ oxidation state.

17. The coated glass article according to claim 16, wherein for formula (1) the ratio of a:b is from 1:50 to 50:1 and/or wherein for formula (2) the ratio of d:e is from 1:50 to 50:1 and/or wherein for formula (3) the ratio of g:h is from 1:50 to 50:1, preferably from 1:50 to 10:1 and/or wherein for formula (3) the ratio of g:i is from 1:40 to 40:1 and/or wherein for formula (3) the ratio of h:i is from 1:50 to 1:50.

18. The coated glass article according to claim 16, wherein the coating further comprises one or more lower layer between the glass substrate and the first layer, and one or more upper layer located further from the glass substrate than the first layer.

19. A method of manufacturing the compound according to claim 1, comprising:

i) for compounds represented by formula (1), providing a Ba-containing precursor, a Mo-containing precursor and an O-containing precursor, wherein at least two of said precursors are the same precursor, and reacting said precursors to form a compound represented by formula (1), or ii) for compounds represented by formula (2), providing a Mo-containing precursor, a P-containing precursor and an O-containing precursor, wherein at least two of said precursors are the same precursor, and reacting said precursors to form a compound represented by formula (2), or iii) for compounds represented by formula (3), providing a Ba-containing precursor, a Mo-containing precursor, a P-containing precursor and an O-containing precursor, wherein at least two of said precursors are the same precursor, and reacting said precursors to form a compound represented by formula (3).

20. The method according to claim 19, wherein the Ba-containing precursor comprises one or more of BaO, $Ba_2MoO_5$, $BaMoO_4$, $BaCO_3$, $Ba(thd)_2$ (Barium tetramethylheptanedionate), Barium bis(N,N,N',N',N"-pentamethyldiethylenetriamine)bis[BREW] $(Ba(C_9H_{23}N_3)_2[C_xH_yC(O)CHC(O)C_xH_y]_2$ (x=3-4, y=2×+1)), Bis(6,6,7,7,8,8,8-heptafluoro-2,2-dimethyl-3, 5-octanedionate)barium $[Ba(FOD)_2]$, Bis(pentamethylcyclopentadienyl)barium, and Bis(n-propyltetramethylcyclopentadienyl)barium, wherein the Mo-containing precursor comprises one or more of $MoO_2$, $Ba_2MoO_5$, $BaMoO_4$, $MoO_3$, $MoO_2(thd)_2$ (Molybdenum(VI) di-oxo bis(2,2,6,6-tetramethyl-3,5-heptanedionate), $MoCl_5$, $Mo(CO)_6$, $MoO_2(acac)_2$, Bis(t-butylimido)bis(dimethylamino)molybdenum(VI), Bis(ethylbenzene)molybdenum, and Cycloheptatriene molybdenum tricarbonyl, wherein the P-containing precursor comprises one or more of a trialkyl phosphate e.g. Triethylphosphate or Trimethylphosphate, $P_2O_5$, $NH_4H_2PO_4$, $(NH_4)_2HPO_4$, $H_3PO_4$, triethylphosphite, phosphorus chloride, phosphorus oxychloride, and Tris(dimethylamino)phosphine, and wherein the O-containing precursor comprises one or more of ethyl acetate, molecular oxygen, water, dimethyamino ethanol (DMAE), $Ba_2MoO_5$, $BaMoO_4$, $BaCO_3$, $Ba(thd)_2$ (Barium tetramethylheptanedionate), Barium bis(N,N,N',N',N"-pentamethyldiethylenetriamine)bis[BREW] $(Ba(C_9H_{23}N_3)_2[C_xH_yC(O)CHC(O)C_xH_y]_2$ (x=3-4, y=2×+1)), 5-octanedionate)barium $[Ba(FOD)_2]$, $MoO_3$, $MoO_2(thd)_2$ (Molybdenum(VI) di-oxo bis(2,2,6,6-tetramethyl-3,5-heptanedionate), Mo(CO)s, $MoO_2(acac)_2$, Cycloheptatriene molybdenum tricarbonyl, Triethylphosphate, Trimethylphosphate, $P_2O_5$, $NH_4H_2PO_4$, $H_3PO_4$, triethylphosphite, phosphorus oxychloride, and Tris(dimethylamino)phosphine.

* * * * *